June 5, 1951 S. E. PETERSON ET AL 2,556,103
SWITCHING ARRANGEMENT FOR COMBINED MANUAL
AND AUTOMATIC TELEPHONE SYSTEMS
Filed Nov. 9, 1946 3 Sheets-Sheet 1

INVENTORS.
SETH E. PETERSON
MORRIS E. GRIFFINS
BY
Chas. W. Candy
ATTORNEY

June 5, 1951 S. E. PETERSON ET AL 2,556,103

SWITCHING ARRANGEMENT FOR COMBINED MANUAL AND AUTOMATIC TELEPHONE SYSTEMS

Filed Nov. 9, 1946 3 Sheets-Sheet 2

*INVENTORS.*
SETH E. PETERSON
MORRIS E. GRIFFINS

*BY*

ATTORNEY

June 5, 1951 S. E. PETERSON ET AL 2,556,103

SWITCHING ARRANGEMENT FOR COMBINED MANUAL AND AUTOMATIC TELEPHONE SYSTEMS

Filed Nov. 9, 1946 3 Sheets-Sheet 3

CONNECTOR CIRCUIT D

INVENTORS.
SETH E. PETERSON
MORRIS E. GRIFFINS

BY

Chas. W. Candy

ATTORNEY

Patented June 5, 1951

2,556,103

UNITED STATES PATENT OFFICE 2,556,103

SWITCHING ARRANGEMENT FOR COMBINED MANUAL AND AUTOMATIC TELEPHONE SYSTEMS

Seth E. Peterson, Bogota, Colombia, and Morris E. Griffins, Riverside, Ill., assignors to Associated Electric Laboratories, Inc., Chicago, Ill., a corporation of Delaware Application November 9, 1946, Serial No. 708,974

13 Claims. (Cl. 179—27)

Figure 1:
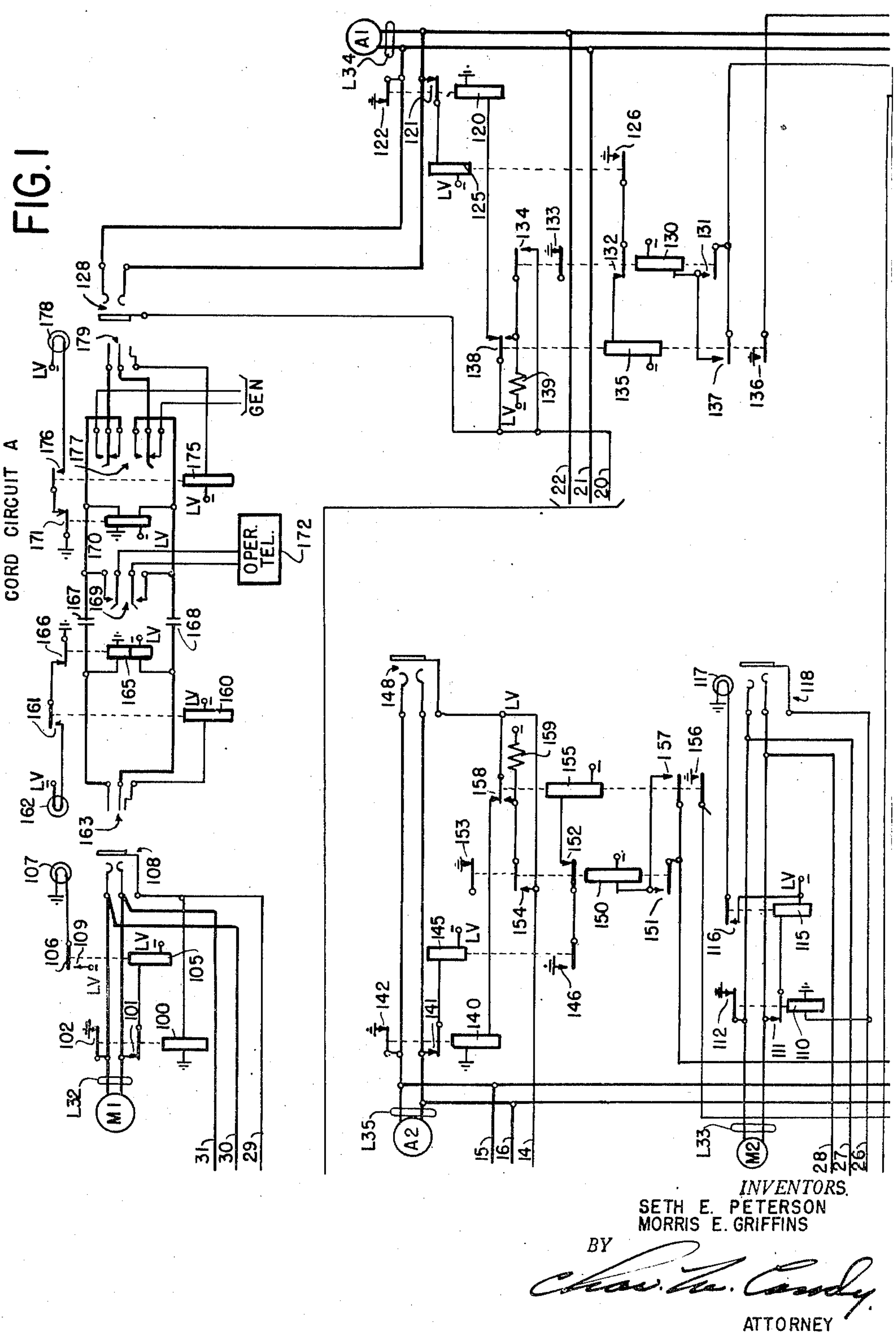

This invention relates to telephone systems in general and is concerned particularly with improvements in the circuits and apparatus employed in arranging a manual telephone system for partial automatic operation.

The problem of providing either manual or automatic service in a telephone system is complicated by the fact that automatic switching equipment is commonly operated on a higher voltage than that employed for manual switching equipment and by the further fact that the polarity for testing and guarding in automatic equipment is reversed as compared with the usual manual equipment. These factors present substantial difficulties, particularly when both automatic and manual lines are to be permanently retained in the system.

It has been common practice, when both automatic and manual lines are operated in the same telephone system, to route calls from automatic lines to manual lines by way of operator positions. When the calls originate on manual lines, special equipment is provided in the operator positions, or special operator positions are provided for completing calls to automatic lines.

The present invention provides for direct access to all of the lines in the system by both the automatic lines and the operator positions. Lines which are to have manual service utilize a standard manual line circuit and require no modification except the connection of a multiple of the line and test conductors to the proper automatic equipment. Lines which are to have automatic service are supplied with an automatic line circuit which is connected to a manual circuit with only a slight modification of the latter. The line conductors and a test conductor of automatic lines ar multipled to jacks appearing at the operator positions. Calls originating on automatic lines are routed by way of the automatic switch train directly to either manual or automatic lines. Calls originating on manual lines are extended by way of the operator positions and the jack multiple directly to either manual or automatic lines.

The primary object of the invention is to provide an improved method of interconnecting manual and automatic telephone switching equipment, thereby facilitating the use of both manual and automatic subscriber lines in the same telephone system.

It is another object of this invention to provide automatic switching equipment which can be connected to a manual telephone system with a minimum amount of modification of the manual switching equipment.

It is a further object of this invention to provide automatic switching equipment which permits manual lines to be readily converted to automatic operation.

It is another object of this invention to provide automatic switching equipment which has substantially the same test and guarding features as a manual system.

A feature of this invention is that the connector switches in the automatic switch train are arranged to switch thru when ground is encountered on the test conductor and to test busy when a relatively low negative potential is encountered on the test conductor.

Another feature of this invention is that a line seized at the manual switchboard or by the automatic switch train will test busy at all of its multiple appearances at the manual switchboard and in the automatic switch train.

A further feature of the invention is that when an automatic line is taken for use in originating a call it immediately is made busy to the manual switchboard.

The objects and features of this invention together with the operation of the circuits and apparatus embodying the same, will be described hereinafter, reference being had to the accompanying drawings, comprising Figs. 1 to 3 inclusive. The drawings should be arranged with Fig. 2 below Fig. 1 and with Fig. 3 to the left of Fig. 1.

Referring now to Fig. 1 there is shown by means of the usual circuit diagrams manual substations M1 and M2 connected over lines L32 and L33 respectively to line equipment and to jacks 108 and 118 respectively. The conductors of the jack 108 are connected to the contacts 373, 374 and 375 in the connector D, Fig. 3, and the conductors of the jack 118 are connected to the contacts 382, 383 and 384 in the connector D, Fig. 3. While only one jack and one set of connector contacts are shown for each line it is to be understood that each line may be multipled to similar jacks in other operator positions and to similar contacts in other connectors. The automatic substantions A1 and A2, also shown in Fig. 1, are similar to the substations M1 and M2 except that they are equipped with dials. The substations A1 and A2 are connected over the lines L34 and L35 respectively to line equipment and to jacks 128 and 148 respectively. The conductors of the jack 128 are multipled to contacts 379, 380 and 381 in connector D, Fig. 3 and the line conductors of the jack 128 are multipled in addition to the contacts 227 and 228 in the finder B, Fig. 2. The conductors of the jack 148 are multipled to contacts 376, 377 and 378 in connector D, Fig. 3 and the line conductors of the jack 148 are multipled in addition to the contacts 224 and 225 in the finder B, Fig. 2. It is to be understood that these jacks and contacts may be multipled to similar jacks and contacts in the switchboard.

The cord circuit A, also shown in Fig. 1, is one of a number provided at the operator positions of the manual switchboard. The cord circuit A is of the conventional common battery type employing a condenser-impedance transmission bridge. It terminates in the plugs 163 and 179 which are suitable for connecting to the lines, such as lines L32 and L34 by way of the jacks such as the jacks 108 and 128. The cord circuit A is connected to the operator's telephone circuit 172 by the operation of the key 169, and ringing potential is applied to a called line thru the plug 179 by the operation of the key 177.

Figure 2:
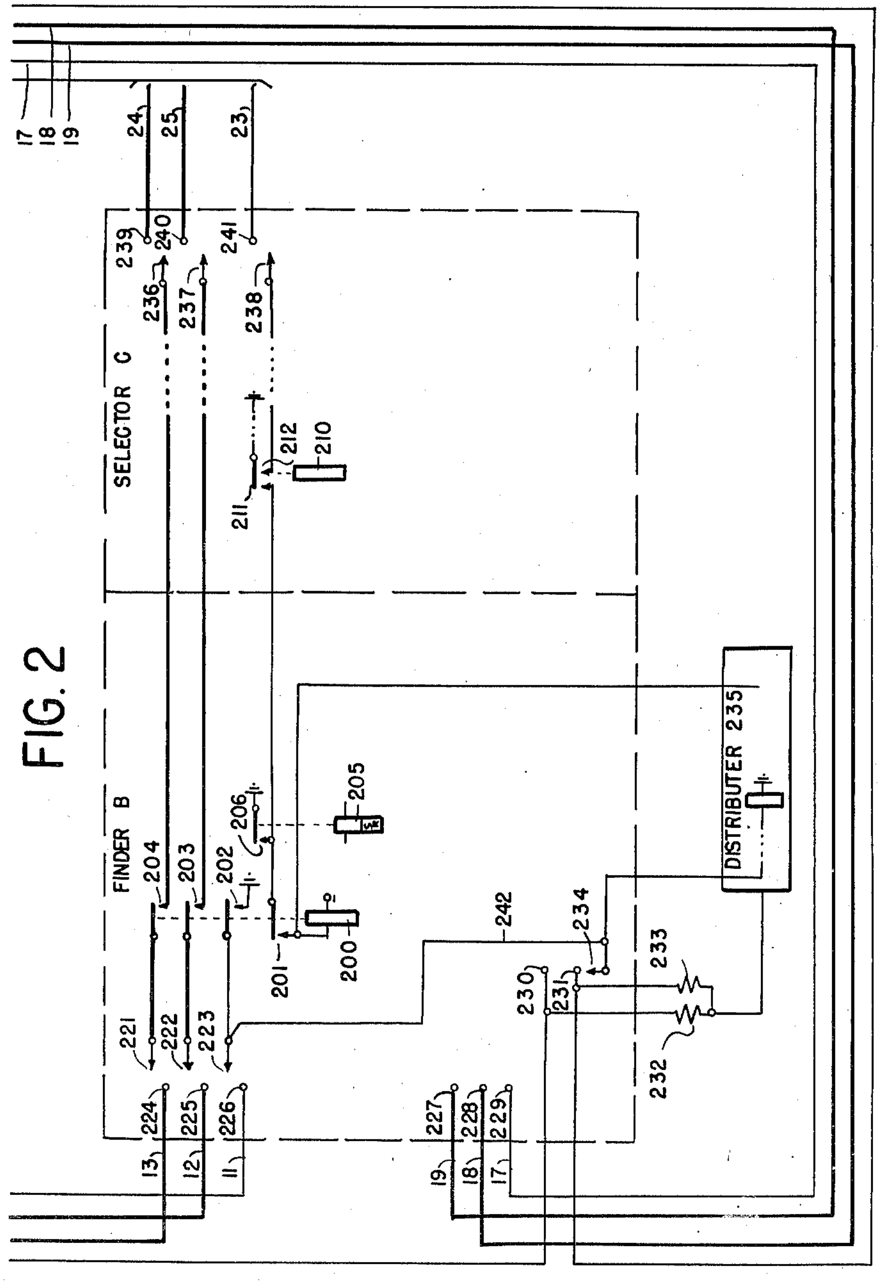

The apparatus shown in Fig. 2 is a skeleton finder and selector by means of which automatic substations, such as the substation A2 have access to connectors, such as the connector D. While only one finder, B, and one selector, C, are shown other similar finders and selectors are provided each having access to substations such as the substation A2 and to connectors such as the connector D.

Figure 3:
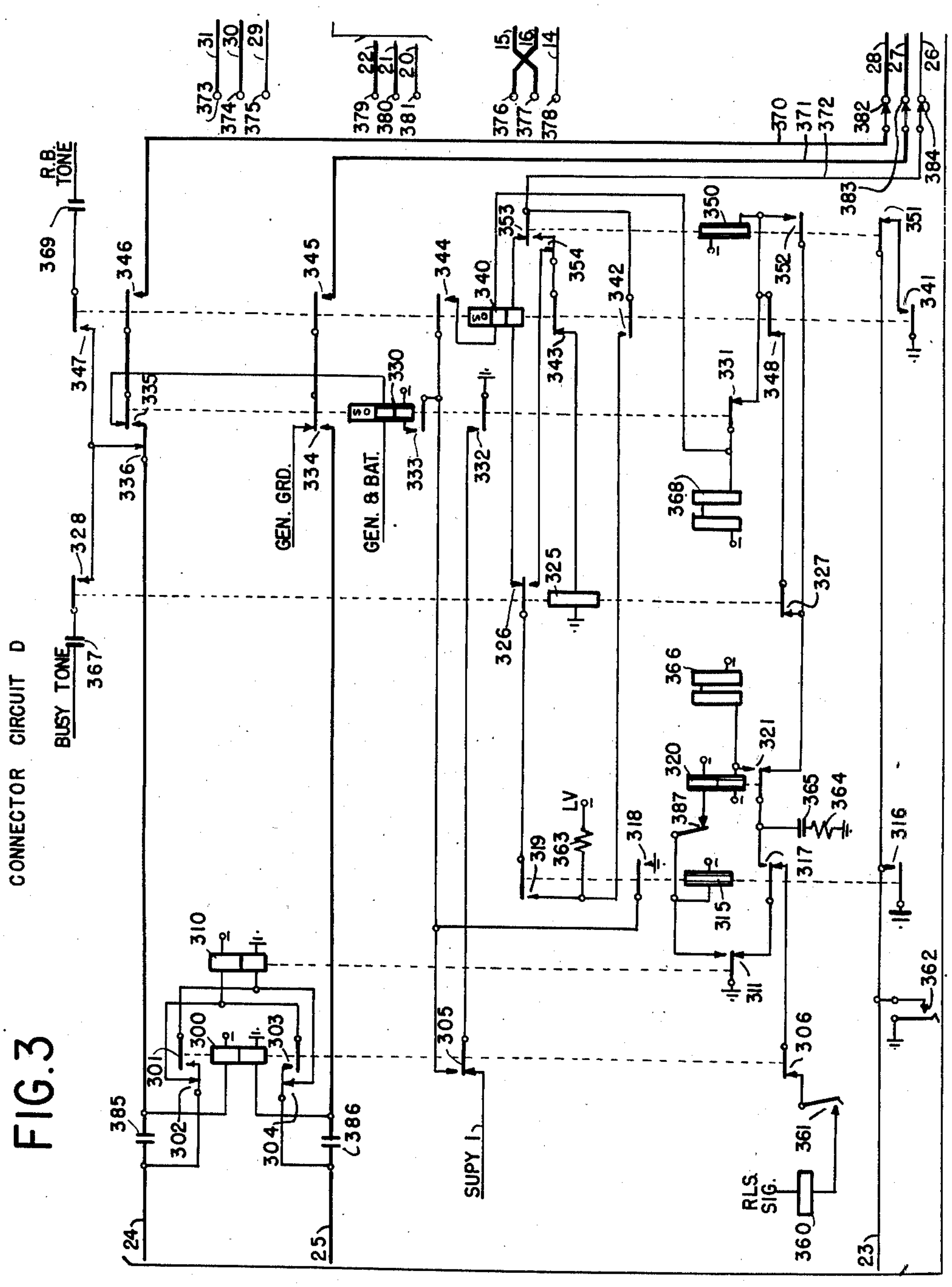

In Fig. 3 is shown a connector D, which is similar to the well known Strowger vertical and rotary type such as described in Patent 2,040,153 granted May 12, 1936 to Seth Peterson. The connector D differs from the ordinary Strowger connector in that a negative potential, equal to the negative potential used for operating the manual switchboard, is connected thru resistor 363 and is utilized for the testing and guarding operations of the connector. The connector D has access to both automatic and manual substations, such as M2 and A2, and is accessible to automatic substations such as A2 by way of finders such as finder B and selectors such as selector C.

Assume now that a call is to be made from the substation M1. The receiver at the substation M1 is removed operating the line relay 105 from ground thru armature 102, thru the line L32 and the substation M1, thru armature 101 and the winding of the line relay 105 to battery. The line relay 105, at armature 106, closes a circuit to the lamp 107 which lights, signalling the switchboard that a call is waiting. Assume now that the cord circuit A is used for answering the call. The plug 163 is inserted in the jack 108 and battery thru the winding of the relay 160, thru the lower conductor of the plug 163 is connected to the contact 375 making the line L32 busy to the connector D. The cut-off relay 100 is operated from ground thru its own winding, thru the lower conductor of the plug 163 and the winding of the relay 160 to battery, disconnecting the line relay 105 from the line L32 at armature 101, and disconnecting ground from the line L32 at armature 102. The line relay 105 restores and extinguishes the lamp 107 at armature 106. A circuit may now be traced from battery thru the lower winding of the relay 165, center conductor of the plug 163, thru the line L32 and the substation M1, upper conductor of the plug 163, and the upper winding of the relay 165 to ground. The relay 165 operates and opens a circuit to the lamp 162 at armature 166. The relay 160 operated in series with the cut-off relay 100 prepares a circuit to the lamp 162 at armature 161.

The operator now connects the operator's telephone 172 to the cord circuit A by operating the key 169 and a transmission circuit is established between the substation M1 and the operator's telephone thru the condensers 167 and 168. The operator now ascertains the connection desired by the substation M1 and extends the connection by inserting the plug 179 into the jack associated with the called substation.

Assuming that the substation A1 is desired, the operator first contacts the upper conductor of the plug 179 to the lower conductor of the jack 128, to which the cut-off relay 120 is connected. If the line L34 is not busy ground thru the winding of the cut-off relay 120 and the armature 138 is encountered on the test conductor and as this is connected thru the upper conductor of the plug 179 thru the upper winding of the relay 170 to ground no current will flow thru this circuit. This absence of current flow indicates to the operator that the line L34 is not busy and the plug 179 is inserted into the jack 128. A circuit may now be traced from battery thru the winding of the relay 175, lower conductor of the plug 179, armature 138 and the winding of the cut-off relay 120, to ground. The relay 175 operates and closes a circuit from ground thru armatures 171 and 176 and the lamp 178 to battery causing the lamp 178 to light. The cut-off relay 120 operates, disconnects ground from the line L34 at armature 122 and disconnects the line relay 125 from the line L34 at armature 121. Battery thru the winding of the relay 175 is connected to the contact 381 making the line L34 busy to the connector D. The operator operates the key 177 connecting ringing potential from the generator GEN over the upper and center conductors of the plug 179 and the line L34 to signal the substation A1. The keys 177 and 169 are then restored and the lighted lamp 178 serves as an indication to the operator of the unanswered condition of the call. When the receiver is removed at the substation A1 the relay 170 is operated from battery thru its lower winding, center conductor of the plug 179, thru the line L34 and the substation A1, upper conductor of the plug 179 and the upper winding of the relay 170 to ground. The relay 170 opens the circuit to the lamp 178 at armature 171, thus signalling the operator that the call has been answered.

When the conversation is ended the receiver at the substation M1 is replaced allowing the relay 165 to restore. Ground thru armatures 166 and 161 and the lamp 162 to battery causes the lamp 162 to light. The replacement of the receiver at the substation A1 allows the relay 170 to restore and, from ground thru armatures 171 and 176 and the lamp 178 to battery, cause the lamp 178 to light. The two lighted lamps indicate to the operator that the call has been ended and that the cord circuit A is to be disconnected from the lines L32 and L34. Removal of the plug 163 from the jack 108 opens the circuit to the cut-off relay 100 and the relay 160. The cut-off relay 100 restores and connects ground and the line relay 105 to the line L32 at armatures 102 and 101 respectively. The relay 160 restores and extinguishes the lamp 162 by opening its circuit at armature 161. Battery thru the winding of the relay 160 is disconnected from the contact 375 and other similar contacts and from the lower conductor of the jack 108 and multiples thereof and the line L32 will now test not busy to connectors such as connector D or to cord circuits such as the cord circuit A. Removal of the plug 179 from the jack 128 opens the circuit to the cut-off relay 120 and the relay 175. The cut-off relay 120 restores and connects ground and the line relay 125 to the line L34 at armatures 122 and 121 respectively. The relay 175 restores and extinguishes the lamp 178 by opening its circuit at armature 176. Battery thru the winding of the relay 175 is disconnected from the contact 381 and other similar contacts and from the lower conductor of the jack 128 and multiples thereof and the line L34 will now test not busy to connectors such as connector D or to cord circuits such as the cord circuit A.

It may be noted that connections may be extended from the substantion M1 to other substations such as the substations M2 or A2 in the same manner as described above for the connection from the substation M1 to the substation A1 and that connections may be extended in a like manner from the substation M2 to other substations.

Assume now that a call is to be made from the automatic substation A2. The receiver is removed at the substation A2 and battery thru the winding of the line relay 145, armature 141, thru the line L35, the substation A2 and armature 142 to ground operates the relay 145. The relay 145 energizes the relay 155 from ground thru armatures 146 and 152 and the winding of the relay 155 to battery. The relay 155 operates and at armature 158 disconnects the cut-off relay 140 from the lower conductor of the jack 148 and from the contact 378 and connects battery thru the resistor 159 to the lower conductor of the jack 148 and contact 378, and multiples thereof, to make the line L35 busy to connectors, such as the connector D, and to cord circuits such as the cord circuit A, at armature 156 ground is connected to contacts, such as the contact 230, in finders, such as the finder B, and thru resistor 232 to the distributor 235, and at armature 157 battery thru the winding of the cut-off relay 150 is connected to contacts, such as contact 226, in finders, such as the finder B.

The finder B is one of a group of similar finders having access to the substation A2. The distributor 235 selects an individual one of the finders and in response to ground thru a resistor, such as the resistor 232, causes the selected finder to hunt for a calling line. Assume now that the finder B has been selected for operation by the distributor 235.

Ground thru resistor 232, over a circuit previously traced, causes the distributor 235 to start the finder B and cause it to hunt for a called line. The finder B first moves its wiper 234 over contacts such as contacts 231 and 230. In this case ground on the contact 230 causes the finder B to rotate its wipers 221, 222 and 223 respectively, until in engagement with contacts such as contacts 224, 225 and 226 respectively, and at the same time disengage the wiper 234 from the contact 230. Assume now that the wiper 223 is engaged with the contact 226 to which battery is connected over a circuit previously traced. Battery extended thru the wiper 223 over the conductor 242 to the distributor causes the distributor to stop the hunting action of the finder B and operate the relay 200 to connect the line L35 thru to the selector C, thru wipers 221 and 222 and armatures 204 and 203. Ground thru armature 202, wiper 223, contact 226, armature 157 and the winding of the cut-off relay 150 to battery energizes the cut-off relay 150. The cut-off relay 150 operates closing a circuit from battery thru resistor 159 and armature 154 to the lower conductor of the jack 148 and contact 378, opening the circuit to the relay 155 at armature 152, and closing a holding circuit for itself from contact 226 thru armature 151. The relay 155 restores disconnecting ground at armature 156 from the resistor 232 and the distributor 235, and closing a circuit to the cut-off relay 140 from battery thru the resistor 159, armature 154, armature 158 and the winding of the cut-off relay 140 to ground. The cut-off relay 140 operates disconnecting ground and the line relay 145 from the line L35 at armature 142 and 141 respectively.

The selector C is preferably of the well known Strowger type, responds to the first digit dialed at the substation A2, to position the wipers 236, 237 and 238 adjacent the level of contacts corresponding to the number dialed. During the interval between the first and second digits, the selector C operates automatically to select an idle line in the selected group of lines extending to the group of connectors in which the connector D is included. Assuming that the connector D is selected, the connection is extended thereto by way of the selector wipers 236, 237 and 238, contacts 239, 240 and 241 and the conductors 24, 25 and 23 and the connector D is prepared for the second and final digits. When the selector C is seized, the release relay 210 is operated to complete, thru armatures 211 and 201, a holding circuit for the relay 200, and the relay 200 is extended thru contact 212, wiper 238, contact 241 and conductor 23 to the connector D.

A circuit may now be traced from battery thru the upper winding of the relay 310, contact 302, conductor 24, contact 239, wiper 236, armature 204, wiper 221, contact 224, thru the line L35 and the substation A2, contact 225, wiper 222, armature 203, wiper 237, contact 240, conductor 25, contact 304, lower winding of the relay 310 to ground. The relay 310 operates and at armature 311 closes a circuit to the relay 315, and thru off normal springs 387 to the upper winding of the relay 320. The relay 315 operates and at armature 316 connects ground over conductor 23, contact 241, wiper 238, contact 212, armatures 211 and 201 and the winding of the relay 200 to hold the same, at armature 317 closes part of the incomplete impulsing circuit, at armature 318 prepares a holding circuit for the relays 330 and 340, and connects battery thru resistor 363, armatures 319 and 326, the lower winding of the relay 340 and armature 353 to the wiper 372. The relay 320 operates and at armature 321 prepares a circuit to its lower winding and the vertical magnet 366 in multiple. The relay 310 responds to the second digit and at armature 311 opens and closes a circuit to the lower winding of the relay 320 and the vertical magnet 366, which may be traced from ground thru armatures 311, 317 and 321. At the first vertical step the off normal springs 387 are opened thus opening the starting circuit to the upper winding of relay 320. The vertical magnet operates the wipers 370, 371 and 372 to the level corresponding to the dialed digit. The relays 315 and 320 are slow to release and do not restore during impulsing. After second digit has been received the relay 310 operates and at armature 311 holds the relay 315. The relay 320, after a short interval, restores and at armature 321 prepares a circuit to the relay 350 and the rotary magnet 368 in multiple. The relay 310 responds to the final digit and at armature 311 opens and closes a circuit to the relay 350 and the rotary magnet 368 in multiple which may be traced from ground thru armatures 311, 317, 321, 327, 348 to the winding of the relay 350 and thru armature 331 to the rotary magnet 368. The relay 350 operates, at armature 352 short circuits armature 327 to prevent interference with the rotary operation if the relay 325 operates during the same, and at armature 353 disconnects the lower winding of the relay 340 from the wiper 372 and connects the wiper 372 thru armature 343 and the winding of the relay 325 to ground. The relays 315 and 350 are slow to release and do not restore during impulsing. The rotary magnet steps the wipers to the contacts corresponding to the dialed digit which in this case are assumed to be the contacts 382, 383 and 384 associated with the line L33. If the line L33 is busy, battery will be encountered on the lower conductor of the jack 118 and the contact 384. This battery may be supplied thru the lower conductor of a plug, such as the plug 163, or by another connector, such as the connector D as will be subsequently described. Battery on the contact 384, thru wiper 372, armatures 353 and 343 and the winding of the relay 325 to ground operates the relay 325. The relay 325 connects busy tone thru condenser 367, armature 328, contact 336 and condenser 385 to the calling line, opens the starting circuit to the relay 350 and the rotary magnet 368 at armature 327, and prepares its own holding circuit at armature 326. Shortly after the final digit has been received the relay 350 restores and at contact 354 closes a holding circuit for the relay 325 which may be traced from battery thru resistor 363, armatures 319, and 326, contact 354, armature 343 and the winding of the relay 325 to ground. The relay 325 remains operated and supplies busy tone to the calling line until the calling line releases.

If battery is not connected to the contact 384, ground thru the winding of the relay 110, contact 384, wiper 372, armatures 353 and 343 is connected thru the winding of the relay 325 to ground. Thus the relay 325 will not operate or, if it is operated, will release. When the relay 350 restores, after the final digit has been received, a circuit may be traced from battery thru resistor 363, armatures 319 and 326, the lower winding of the relay 340, armature 353, wiper 372, contact 384, and the winding of the cut-off relay 110 to ground. The cut-off relay 110 operates and disconnects ground and the line relay 115 from the line L33 at armatures 112 and 111 respectively. The relay 340 operates its armature 344 first closing a circuit from battery thru the rotary magnet 368, upper winding of the relay 340, and armatures 344 and 318 to ground. The upper winding of the relay 340 operates the relay 340 in full, closing a multiple holding ground thru armatures 341 and 351 to conductor 23, disabling the starting circuit to the relay 350 and the rotary magnet at armature 348, connecting battery thru resistor 363 thru armature 342 to the wiper 372 and the contact 384 to make the line L33 busy, opening the incomplete circuit to the relay 325 at armature 343, connecting ring back tone thru condenser 369, armature 347, contacts 336 and condenser 385 to the calling line, and connecting GEN. GRD. thru armatures 334 and 345, wiper 371, contact 383, thru the line L33 and the substation M2, contact 382, wiper 370, armatures 346 and 345 and the upper winding of the relay 330 to GEN. & BAT. to signal the substation M2. The relay 330 will not operate in series with the signalling device at the substation M2. When the receiver is removed at the substation M2 the upper winding of the relay 330 operates the armature 333. Battery thru the lower winding of the relay 330, thru armatures 333 and 318 to ground operates the relay 330 in full, disconnecting the upper winding of the relay 330 from the wiper 370 at armature 335 and connecting the wiper 370 thru the upper winding of the relay 300 to battery, disconnecting ring back tone from the calling line at contact 336, disconnects the wiper 371 from GEN. GRD. at armature 334 and extending the wiper 371 thru the lower winding of the relay 300 to ground, preparing a multiple holding ground for its lower winding and the upper winding of the relay 340 at armature 332, and disabling the relay 350 and the rotary magnet 368 at armature 331.

Battery thru the upper winding of the relay 300, armature 335 and 346, wiper 370, contact 382, thru the line L33 and the substation M2, contact 383, wiper 371, armatures 345 and 334 and the lower winding of the relay 330 to ground operates the relay 300. The relay 300 reverses battery to the calling line at armatures 301 and 303, closes a multiple holding ground to the lower winding of the relay 330 and the upper winding of the relay 340 at armature 305, and opens a part of the incomplete circuit to the release magnet 360 at armature 306. Transmission battery to the substation M2 is supplied thru the winding of the relay 300 and to the substation A2 thru the windings of the rotary 310. Voice currents between the two substations pass thru the condensers 385 and 386.

When the conversation is ended the receivers are replaced at the substations A2 and M2 thus allowing the relays 310 and 300 to restore. Relay 310 opens relay 315 which shortly thereafter restores. The relay 300 restores, opening a multiple holding ground to the relays 330 and 340 at armature 305 and preparing a circuit to the release magnet 360 at armature 306. The relay 315, at armature 318 opens the holding circuits to the relays 330 and 340, at armature 316 removes a multiple holding ground from the conductor 23, and at armature 317 completes the circuit to the release magnet which may be traced from battery over the RLS. SIG. conductor, thru the winding of the release 360, off normal springs 361, armatures 306, 317 and 311 to ground. The relays 330 and 340 restore, and the release magnet allows the switch wipers to restore to normal position thus preparing the connector D for further operations. When the wipers reach their normal position, the off normal springs 387 are closed, preparing a starting circuit to the relay 320, and the off normal springs 361 are opened thus opening the circuit to the release magnet 360.

It may be noted that battery thru the resistor 363 is connected thru the lower winding of the relay 340 and wiper 372 to contacts, such as contact 384, at the time the relay 350 restores, and that this battery is connected directly to such contacts subsequent to the operation of the relay 340. This battery serves as a busy indication to cord circuits, such as the cord circuit A, and to the connectors, such as the connector D. The battery connected to the resistor 363 is of the same voltage used in the operation of the manual switching equipment, while the battery used for the other operations of the connector D is preferably of the same voltage customarily used for operating automatic switching equipment.

It may be noted that calls can be extended to other substations thru the connector D, such as substation A1, in the same manner as that described in the foregoing for substation M2. If a call is extended from a connector, such as the connector D, to the substation A1 battery over conductor 20 is extended to the lower conductor of the jack 128 and, thru armature 138 and the winding of the cut-off relay 120 to ground. The cut-off relay 120 operates, disconnecting ground and the relay 125 from the line L34 at armatures 122 and 121 respectively. No other equipment associated with the substation A1 is operated at this time. Should the operator contact the upper conductor of the plug 179 to the lower conductor of the jack 128 at this time, current will flow from battery thru the lower conductor of jack 128, upper conductor of plug 179 and the upper winding of the relay 170 to ground. This current flow thru the upper winding of the relay 170 is received in the operator's telephone 172 thru the key 169 as a busy indication.

In the line equipment used with automatic substations, such as the substation A1, the cut-off relay 120 and the line relay 125 are the same as the cut-off relay 100 and the line relay 105 respectively, while the relay 135 and the cut-off relay 130 are respectively the same as the line and cut-off relays customarily used in automatic systems employing finders, such as the finder B. If the relay 135 and the cut-off relay 130 are used in a full automatic system they are not associated with the relays 120 and 125. The relay 135 is connected thru armature 132 directly to one side of the line and ground thru armature 133 is connected directly to the other side of the line. The winding of the cut-off relay 130 is connected directly to the test conductor of the connector multiple, such as the conductor 20. The armature 153 is provided on the relay 150 for the same purpose. The battery connected to the line relay 125 and to the resistor 139 is of the same voltage as the battery used for operating the manual switching equipment while the battery connected to the cut-off relay 130 and the relay 135 is of the same voltage as the battery used for operating the automatic switching equipment.

The line equipment for a substation, such as the substation M1 may be easily modified for use with automatic switching equipment. Battery normally connected to the contact 109 is replaced by ground. The armature 106 is disconnected from the lamp 107 and is connected thru an armature, such as the armature 132, to a line relay, such as the line relay 135 and the cut-off relay 100 is connected thru an armature such as the armature 138 to the lower conductor of the jack 108 and to the contact 375. A cut-off relay such as the relay 130 is provided and connections made to the finders, such as the finder B.

Having described my invention, what is considered to be new and is desired to be protected by Letters Patent will be set forth in the following claims.

What is claimed is:

1. In a telephone system, a line circuit, automatic switches having access to said line circuit, a first control conductor for said line circuit to which a potential of one character is connected to make said line circuit busy, a potential of one character, a potential of a different character, means for connecting said potential of one character to said first control conductor, a second control conductor extending from said line circuit to said automatic switches, means for connecting one of said switches to said line circuit, means in a connected one of said switches for connecting said potential of a different character to said second control conductor, and means in said line circuit responsive to the potential connected to said second control conductor for applying a potential of said one character to said first control conductor to thereby make said line circuit busy.

2. In a telephone system, a line circuit, two control conductors for said line circuit, two classes of automatic switches, means for connecting a switch of one class to said line circuit, means for connecting a switch of the other class to said line circuit, a relay in said line circuit, means for operating said relay over one of said control conductors responsive to the connection of a switch of said one class to said line circuit, means controlled by said relay for preventing the connection of a switch of said other class thereto, and a second relay in said line circuit, means for operating said second relay over the other of said control conductors responsive to the connection of a switch of said other class to said line circuit, and means controlled by said second relay for preventing the connection of a switch of said one class to said line circuit.

3. In a telephone system, a subscriber line circuit, two classes of automatic switches and a manual switchboard having means for seizing said line circuit, a control conductor for said line circuit extending to switches of one of said classes and to said manual switchboard, a guarding potential and means for applying said guarding potential to said conductor from a switch of said one class in case said line circuit is seized thereby, means for applying said guarding potential to said conductor from said manual switchboard in case said line circuit is seized thereby, a source of guarding potential in said line circuit and means connecting said source to said conductor in case said line circuit is seized by a switch of said other class.

4. In a telephone system, line circuits individual to subscriber lines, two cut-off relays for each of said line circuits, automatic switches of two different classes, means for connecting a switch of either class to one of said line circuits, means responsive to the connection of a switch of one class to one of said line circuits for operating one of the cut-off relays thereof to prevent the connection of another switch of either class to said one line circuit, and means responsive to the connection of a switch of the other class to one of said line circuits for operating both of the cut-off relays thereof to prevent the connection of another switch of either class to said one line circuit.

5. In a telephone system, a line circuit individual to a subscriber line, two cut-off relays for said line circuit, automatic switches of two different classes, a manual switchboard, means for connecting a switch of either class to said line circuit, means for connecting said manual switchboard to said line circuit, means for operating one of the cut-off relays of said line circuit responsive to the connection of an automatic switch of one of said classes thereto, means for operating said one cut-off relay responsive to the connection of said manual switchboard to said line circuit, and means for operating both of the cut-off relays of said line circuit responsive to the connection of an automatic switch of said other class thereto, means including said one cut-off relay for making said line circuit busy to said automatic switches and said manual switchboard, and other means including both of said cut-off relays for making said line circuit busy to said automatic switches and said manual switchboard.

6. In a telephone system, subscriber line circuits terminating in bank contacts accessible to automatic switches and in switching contacts at a manual switchboard, a source of negative potential, means responsive to the connection of one of said automatic switches to one of said line circuits for connecting a negative potential to the bank contacts terminating a line circuit to thereby seize said line circuit and make the same busy, means at said manual switchboard for connecting a negative potential over a contact terminating a line circuit to thereby seize a line circuit and make the same busy, and means in one of said line circuits responsive to the connection of another of said automatic switches thereto for connecting a negative potential to the bank contacts and the switching contacts terminating said one line circuit to make said one line circuit busy.

7. In a switching system, an automatic switch, a potential of one polarity, a potential of an opposite polarity, two control conductors, a first relay, a second relay having a winding, means for seizing said switch, means for operating said first relay responsive to the seizure of said switch, contacts on said first relay for connecting a potential of one polarity to one of said control conductors, means for connecting a potential of an opposite polarity thru the winding of said second relay to the other of said control conductors, means for operating said second relay, and a contact on said second relay for connecting said potential of opposite polarity directly to said other control conductor.

8. In a switching system, an automatic switch, two control conductors, a first relay, a second relay having a winding, means for seizing said switch, means for operating said first relay responsive to the seizure of said switch, a potential of one polarity, a potential of an opposite polarity, said first relay being effective in case it is operated to connect said potential of one polarity to one of said control conductors and to connect said potential of an opposite polarity thru the winding of said second relay to the other of said control conductors, means for operating said second relay, said last means including said potential of opposite polarity and said other control conductor, said second relay effective upon operation for connecting said potential of opposite polarity directly to said other control conductor and for connecting said potential of one polarity to said one control conductor.

9. In a telephone system, an automatic switch accessible to another automatic switch and having access to a plurality of outlet paths, a potential of one polarity, a potential of opposite polarity, means for connecting said other automatic switch to said one automatic switch, means in said one automatic switch responsive to the connection of said other automatic switch thereto for connecting a potential of one polarity to said other automatic switch to hold the same, and means in said one automatic switch for connecting a potential of the opposite polarity to any one of said outlet paths, said last potential being effective for seizing and guarding said one outlet path.

10. In a telephone system a connector switch accessible to automatic switches and having access to a plurality of line circuits, a potential of one polarity, a potential of an opposite polarity, means for connecting one of said automatic switches to said connector switch, means for connecting said connector switch to any one of said line circuits, means in said connector switch for supplying a potential of one polarity to a connected one of said automatic switches to hold the same, and means in said connector switch for connecting a potential of an opposite polarity to a connected one of said line circuits to seize and guard said one line circuit.

11. In a telephone system, a plurality of line circuits, a plurality of automatic switches accessible to calling ones of said line circuits and having access to called one of said line circuits, means for seizing one of said automatic switches from a calling one of said line circuits, a potential of one polarity, control means for connecting to said calling line circuit said potential of one polarity to hold said calling line circuit, means in said seized switch for controlling said control means, means for connecting said seized one of said automatic switches to a called one of said line circuits, a potential of opposite polarity, and means in said last mentioned automatic switch for connecting to said called line circuit, said potential of opposite polarity to seize and hold said called line circuit.

12. In a telephone system, a line circuit, an automatic switch, two different paths for establishing connections between said line circuit and said switch, two control conductors in said switch, a potential of one polarity, means effective in case a connection is established betwen said line circuit and said switch over one of said paths for connecting said potential of one polarity to one of said control conductors to hold said line circuit, a potential of opposite polarity, and means in said switch effective in case a connection is established between said line circuit and said switch over the other of said paths for connecting said potential of opposite polarity to the other of said control conductors to hold said line circuit.

13. In a telephone system, a line circuit, automatic switches and a manual switchboard having access to said line circuit, a first control conductor, a potential of one polarity, means for connecting said manual switchboard to said line circuit, means at said manual switchboard for connecting said potential of one polarity to said first control conductor to make said line circuit busy in case said manual switchboard is connected thereto, a second control conductor, a potential of another polarity, means for connecting an automatic switch to said line circuit, means in an automatic switch connected to said line circuit for connecting said potential of another polarity to said second control conductor, and means in said line circuit responsive to the potential connected to said second control conductor for connecting a potential of said one polarity to said first control conductor to thereby make said line circuit busy.

SETH E. PETERSON.
MORRIS E. GRIFFINS.

REFERENCES CITED

The following references are of record in the file of this patent:

UNITED STATES PATENTS

| Number | Name | Date |
|---|---|---|
| 1,393,429 | Clausen | Oct. 11, 1921 |
| 1,930,522 | Keyser | Oct. 17, 1933 |
| 2,289,895 | Abbott | July 14, 1942 |
| 2,337,411 | Peterson | Dec. 21, 1943 |
| 2,386,130 | Mahoney | Oct. 2, 1945 |